US012626580B2

(12) United States Patent
Sanji et al.

(10) Patent No.: US 12,626,580 B2
(45) Date of Patent: May 12, 2026

(54) COMPONENT NOTIFICATION DEVICE, FEEDER RACK, AND COMPONENT NOTIFICATION METHOD

(71) Applicant: FUJI CORPORATION, Chiryu (JP)

(72) Inventors: Mitsuru Sanji, Toyota (JP); Kenji Hara, Kariya (JP)

(73) Assignee: FUJI CORPORATION, Chiryu (JP)

( * ) Notice: Subject to any disclaimer, the term of this patent is extended or adjusted under 35 U.S.C. 154(b) by 77 days.

(21) Appl. No.: 18/706,632

(22) PCT Filed: Nov. 29, 2021

(86) PCT No.: PCT/JP2021/043637
§ 371 (c)(1),
(2) Date: May 1, 2024

(87) PCT Pub. No.: WO2023/095336
PCT Pub. Date: Jun. 1, 2023

(65) Prior Publication Data
US 2025/0014445 A1 Jan. 9, 2025

(51) Int. Cl.
*G08B 21/18* (2006.01)
*G08B 3/10* (2006.01)
*G08B 5/38* (2006.01)

(52) U.S. Cl.
CPC ......... *G08B 21/182* (2013.01); *G08B 3/1008* (2013.01); *G08B 5/38* (2013.01)

(58) Field of Classification Search
CPC ....... G08B 21/182; G08B 3/1008; G08B 5/38
USPC ........................................................ 340/602
See application file for complete search history.

(56) References Cited

U.S. PATENT DOCUMENTS

| | | | | |
|---|---|---|---|---|
| 5,606,264 A * | 2/1997 | Licari | .................. | G01N 27/048 324/696 |
| 6,157,306 A * | 12/2000 | Mularoni | ............. | G08B 21/182 206/242 |
| 6,622,399 B1 * | 9/2003 | Theriault | .......... | H01L 21/67769 34/218 |
| 6,698,272 B1 * | 3/2004 | Almirante | ............. | H01H 37/74 73/11.04 |

(Continued)

FOREIGN PATENT DOCUMENTS

| | | |
|---|---|---|
| JP | 2013-235906 A | 11/2013 |
| JP | WO 2021/053832 A1 | 3/2021 |

OTHER PUBLICATIONS

International Search Report mailed on Feb. 15, 2022 in PCT/JP2021/043637 filed on Nov. 29, 2021 (2 pages).

*Primary Examiner* — Zhen Y Wu
(74) *Attorney, Agent, or Firm* — Oblon, McClelland, Maier & Neustadt, L.L.P.

(57) ABSTRACT

A component notification device includes a determination section and a notification section. When a component container accommodating a component to be mounted on a board is exposed to the atmosphere, the determination section determines whether the component accommodated in the component container is a management target component requiring humidity management. When the determination section determines that the component is the management target component, the notification section notifies the presence of the management target component through at least one of visual, auditory, and tactile senses of a worker.

13 Claims, 6 Drawing Sheets

(56) References Cited

U.S. PATENT DOCUMENTS

| | | | | |
|---|---|---|---|---|
| 6,759,862 | B2 * | 7/2004 | Kou | G01R 31/2881<br>374/45 |
| 6,778,878 | B1 * | 8/2004 | Kou | H05K 13/0417<br>700/95 |
| 6,879,869 | B2 * | 4/2005 | Kou | H05K 13/0882<br>700/117 |
| 7,164,281 | B2 * | 1/2007 | Kou | H05K 3/3415<br>324/763.01 |
| 2003/0030429 | A1 * | 2/2003 | Kou | G01R 31/2881<br>324/527 |
| 2004/0221475 | A1 * | 11/2004 | Theriault | F26B 9/066<br>34/523 |
| 2007/0171083 | A1 * | 7/2007 | Kou | G01N 27/223<br>340/604 |
| 2017/0138922 | A1 * | 5/2017 | Potyrailo | G01N 33/2888 |

* cited by examiner

COMPONENT NOTIFICATION DEVICE, FEEDER RACK, AND COMPONENT NOTIFICATION METHOD

TECHNICAL FIELD

The present description discloses a technique related to a component notification device, a feeder rack, and a component notification method.

BACKGROUND ART

The electronic component mounting system described in Patent Literature 1 includes an exposure time management section, a mounting line control section, and a check-in processing section. The exposure time management section measures the exposure time during which a humidity management target component is exposed to the atmosphere for each reel, and records the cumulative exposure time. The mounting line control section compares the exposure time limit set for the humidity management target component with the exposure time, specifies the electronic component mounting device equipped with the reel of the humidity management target component exceeding the exposure time limit based on the location information, and stops the operation by the electronic component mounting device.

The check-in processing section performs check-in processing when an electronic component stored in a component storage area is loaded. Specifically, the check-in processing section determines whether the electronic component to be loaded is a humidity management target component, and determines whether the exposure time limit is exceeded when the electronic component to be loaded is a humidity management target component. Then, when the exposure time limit has already been exceeded, the check-in processing section notifies that the electronic component cannot be used as it is in production.

PATENT LITERATURE

Patent Literature 1: JP-A-2013-235906

BRIEF SUMMARY

Technical Problem

However, Patent Literature 1 does not describe a specific form in which a humidity management target component is notified.

In view of such circumstances, the present description discloses a component notification device, a feeder rack, and a component notification method capable of notifying the presence of a management target component requiring humidity management.

Solution to Problem

The present description discloses a component notification device including a determination section and a notification section. When a component container accommodating a component to be mounted on a board is exposed to the atmosphere, the determination section determines whether the component accommodated in the component container is a management target component requiring humidity management. When the determination section determines that the component is the management target component, the notification section notifies presence of the management target component through at least one of visual, auditory, and tactile senses of a worker.

Further, the present description discloses a feeder rack. In this case, the component container is a feeder in which a reel around which a component tape accommodating the component is wound is rotatably supported. The feeder rack includes the component notification device, and is a component holding unit configured to temporarily store the feeder which is unloaded from a storage cabinet and is not yet used for production of a board product or the feeder which is no longer needed after the production of the board product ends.

Further, the present description discloses a component notification method including a determination step and a notification step. In the determination step, when a component container accommodating a component to be mounted on a board is exposed to the atmosphere, it is determined whether the component accommodated in the component container is a management target component requiring humidity management. In the notification step, when it is determined that the component is the management target component in the determination step, it is notified of presence of the management target component through at least one of visual, auditory, and tactile senses of a worker.

Advantageous Effects

According to the above component notification device, a determination section and a notification section are provided. Accordingly, the component notification device can notify of the presence of the management target component requiring humidity management through at least one of the visual, auditory, and tactile senses of a worker. The above description of the component notification device can be similarly applied to the feeder rack and the component notification method.

DESCRIPTION OF EMBODIMENTS

1. Embodiments

Figure 1:
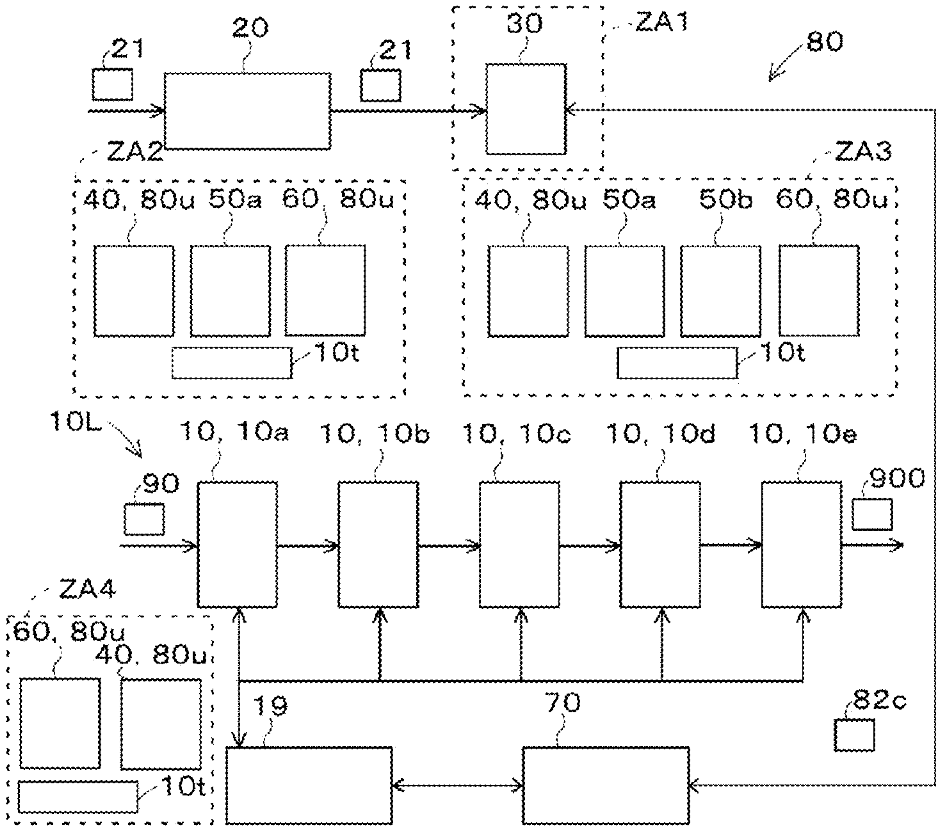
FIG. 1 is a configuration view illustrating an example of a production facility.

FIG. 1 illustrates an example of a production facility to which component notification device 80 is applied. The production facility illustrated in FIG. 1 includes board work line 10L, loading section 20, storage cabinet 30, feeder rack 40, desiccator 50*a*, oven 50*b*, component supply device 60, work table 10*t*, and component management device 70.

1-1. Board Work Line 10L

In board work line 10L, board work machine 10 performs predetermined board work on board 90. The type and number of board work machines 10 are not limited. As illustrated in FIG. 1, board work line 10L of the present embodiment includes multiple (five) board work machines 10 having printer 10*a*, printing inspection machine 10*b*, component mounter 10*c*, reflow oven 10*d*, and appearance inspector 10*e*, and boards 90 are conveyed sequentially in this order by a board conveyance device.

Printer 10*a* prints solder on the mounting position of component 91 of board 90. Printing inspection machine 10*b* inspects the print state of solder which is printed by printer 10*a*. Component mounter 10*c* mounts multiple components 91 on board 90 on which solder is printed. One component mounter 10*c* may be provided, or multiple component mounters 10*c* may be provided. When multiple component mounters 10*c* are provided, multiple component mounters 10*c* can share the load and mount multiple components 91 on board 90.

Component mounter 10*c* includes component supply device 60 that supplies component 91 to be mounted on board 90. Component supply device 60 can supply components 91 by using, for example, feeder 22*a* equipped with reel 21*a* illustrated in FIG. 2A, tray pallet 22*b* equipped with component tray 21*b* illustrated in FIG. 2B, and the like. In reel 21*a*, component tape 21*a*2 accommodating component 91 is wound around main body portion 21*al*. Feeder 22*a* rotatably supports reel 21*a*. A distal end portion of component tape 21*a*2 is drawn out to a component take-out portion provided in feeder 22*a* so that components 91 are subsequently supplied. Reel 21*a* can supply relatively small components 91 such as a chip component and the like.

Components 91 are arranged in component tray 21*b*. Component tray 21*b* can supply relatively large components 91 such as a quad flat package (QFP), a ball grid array (BGA), and the like. Component tray 21*b* supplies component 91 in a state of being mounted on tray pallet 22*b*. Reflow oven 10*d* heats board 90 on which component 91 is mounted by component mounter 10*c*, melts the solder, and performs soldering. Appearance inspector 10*e* inspects the mounting state of component 91 mounted on board 90 by component mounter 10*c*.

In this way, board work line 10L may use multiple (five) board work machines 10 to convey boards 90 in order, execute production processing including inspection processing, and produce board products 900. Board work line 10L may include board work machines 10 such as a function inspector, a buffer device, a board supply device, a board reversing device, a shield mounting device, an adhesive coating device, and an ultraviolet irradiation device as needed.

Multiple (five) board work machines 10 and management device 19 constituting board work line 10L are provided to be able to communicate with each other by a wired or wireless communication section. Management device 19 controls multiple (five) board work machines 10 of board work line 10L, and monitors the operating status of board work line 10L. Management device 19 stores various control data for controlling multiple (five) board work machines 10. Management device 19 transmits the control data to each of multiple (five) board work machines 10. In addition, each of multiple (five) board work machines 10 transmits an operating status and a production status to management device 19.

1-2. Loading Section 20

For example, when reel 21*a* arrives at loading section 20, the following loading work is performed. Then, for example, reel 21*a* is accommodated in an accommodation case, mounted on a carrier, and conveyed to storage cabinet 30. After being stored in storage cabinet 30, reel 21*a* is supplied to board work line 10L as needed.

Figure 2A:
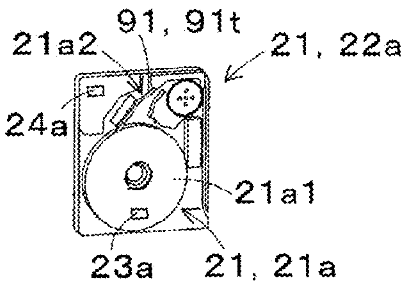
FIG. 2A is a perspective view illustrating an example of a feeder equipped with a reel.

As illustrated in FIG. 2A, identification code 23*a* capable of identifying reel 21*a* is attached to reel 21*a*. As identification code 23*a*, for example, a seal on which a one-dimensional code, a two-dimensional code, or the like is printed, a wireless tag, or the like may be used. Specifically, when reel 21*a* arrives at loading section 20, the worker issues the identification information by using, for example, component management device 70 that manages component 91. Further, the worker reads the barcode or the like attached to reel 21*a* by the supply source (vendor) by using mobile terminal 82*c* such as a barcode reader and the like. Then, the worker can also acquire article information from a database in which article information related to reel 21*a* is registered. The worker issues identification code 23*a* including at least the identification information of the identification information and the article information by using component management device 70.

The worker attaches identification code 23*a* including at least the identification information to the surface of reel 21*a* or the like, and accommodates reel 21*a* in the accommodation case. The worker mounts the accommodation case in which reel 21*a* is accommodated on the carrier. For example, the carrier can be pulled by the worker. Further, the carrier may be an automated guided vehicle that can travel automatically. The carrier can convey reel 21*a* to storage cabinet 30 without using an accommodation case. Further, the worker can convey reel 21*a* to storage cabinet 30 without using a carrier.

Figure 2B:
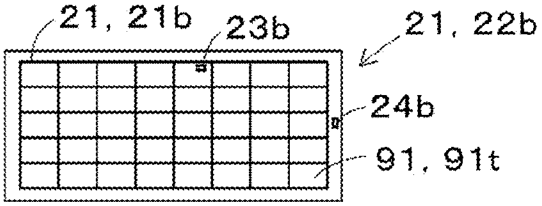
FIG. 2B is a plan view illustrating an example of a tray pallet equipped with a component tray.

Similarly to reel 21*a*, the worker can attach identification code 23*b* capable of identifying component tray 21*b* to component tray 21*b*. As illustrated in FIG. 2B, component tray 21*b* is accommodated in a packaging bag, and identification code 23*b* is attached to the packaging bag. Identification code 23*b* may be attached to component tray 21*b*. As identification code 23*b*, for example, a seal on which a one-dimensional code, a two-dimensional code, or the like is printed, a wireless tag, or the like may be used. The carrier or the worker can convey component tray 21*b* to storage cabinet 30 in the same manner as reel 21*a*.

As illustrated in FIG. 2A, identification code 24*a* capable of identifying feeder 22*a* is attached to feeder 22*a*. As illustrated in FIG. 2B, identification code 24*b* capable of identifying tray pallet 22*b* is attached to tray pallet 22*b*. As identification code 23*a* and identification code 24*b*, for example, a seal on which a one-dimensional code, a two-dimensional code, or the like is printed, a wireless tag, or the like may be used. Further, at least a part of the work performed by the worker described above can be automated by using a conveyance device (for example, a belt conveyor and the like), an actuator (for example, a robot arm and the like), component management device 70, and the like.

1-3. Storage Cabinet 30

Storage cabinet 30 may take various forms as long as storage cabinet 30 can store component container 21 accommodating component 91, such as reel 21*a*, component tray 21*b*, feeder 22*a*, and tray pallet 22*b*, to be mounted on board 90, or an accommodation case accommodating component container 21. When component container 21 is loaded from loading port 30*a*, storage cabinet 30 of the embodiment uses transfer device 35 to move and store component container 21 to storage section 34. Further, when component container 21 stored in storage section 34 is unloaded, storage cabinet 30 moves component container 21 stored in storage section 34 to work space 34*a* close to unloading port 30*b* by using transfer device 35 so that component container 21 can be unloaded. Similarly, storage cabinet 30 can load and unload, and store an accommodation case accommodating at least one component container 21.

Figure 3A:
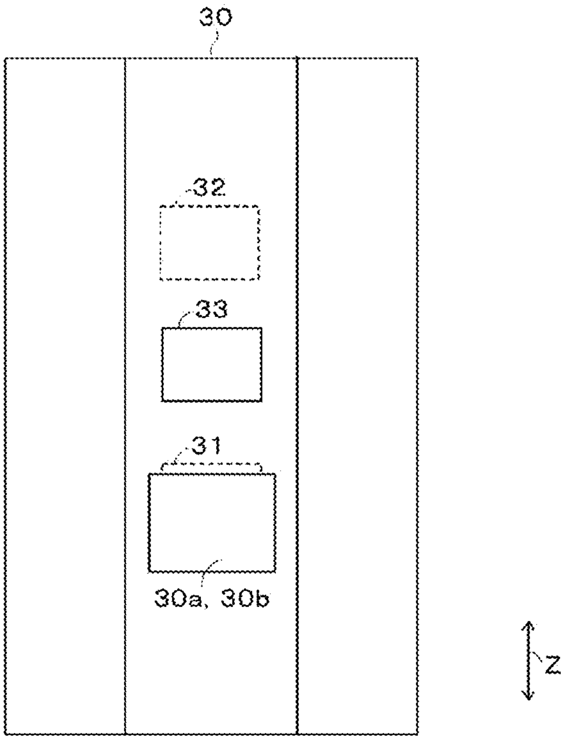
FIG. 3A is a front view illustrating an example of a storage cabinet.
Figure 3B:
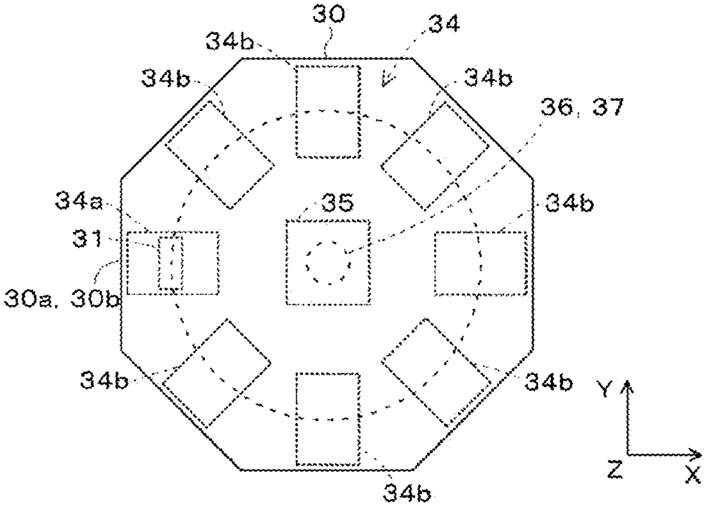
FIG. 3B is a plan view of the storage cabinet illustrated in FIG. 3A.

As described above, storage cabinet 30 of the embodiment is an automated warehouse in which loading and unloading of component container 21 or the accommodation case is automated. Storage cabinet 30 stores component container 21 or the accommodation case, and the worker can also load and unload component container 21 or the accommodation case. As illustrated in FIGS. 3A and 3B, storage cabinet 30 of the embodiment is formed in, for example, an octagonal prism shape. Further, storage cabinet 30 of the embodiment includes loading port 30*a*, unloading port 30*b*, reading device 31, control device 32, display device 33, storage section 34, transfer device 35, humidity adjustment device 36, and temperature adjustment device 37. Component container 21 is loaded into storage cabinet 30 from loading port 30*a* and is unloaded from unloading port 30*b*. In the embodiment, loading port 30*a* and unloading port 30*b* are provided in a common opening portion. Loading port 30*a* and unloading port 30*b* may also be provided in different opening portions.

Reading device 31 is provided above work space 34*a* close to loading port 30*a*. When component container 21 is loaded into storage cabinet 30, reading device 31 reads the identification code (for example, identification code 23*a* or identification code 23*b*) attached to loaded component container 21 and acquires the identification information for identifying loaded component container 21. As reading device 31, a known reading device (for example, a code reader that reads a one-dimensional code or a two-dimensional code) may be used. When the identification code is a wireless tag, storage cabinet 30 may include a wireless device capable of wirelessly communicating with the identification code.

Control device 32 includes a well-known computing device and a storage device, and constitutes a control circuit. Further, control device 32 is communicably connected to reading device 31, display device 33, transfer device 35, humidity adjustment device 36, and temperature adjustment device 37, and can control these devices. For example, control device 32 can control reading device 31. Further, control device 32 can acquire the identification information acquired by reading device 31 from reading device 31.

Further, control device 32 is provided to communicate with management device 19, component management device 70, and the like illustrated in FIG. 1 through a wired or wireless communication section. For example, management device 19 notifies control device 32 of the occurrence of the setup change in board work line 10L. Management device 19 can also notify control device 32 of the occurrence of shortage of component container 21 supplied to board work line 10L. Management device 19 can also notify control device 32 of a possibility that a setup change occurs in a predetermined period. Management device 19 can also notify control device 32 of a possibility that the component container 21 runs short in a predetermined period. Control device 32 unloads necessary component container 21 based on the notification.

As display device 33, a well-known display device may be used, and displays various information so that the worker can visually recognize the data. Display device 33 displays, for example, member information indicating information related to component container 21 stored in storage section 34 in accordance with an operation of the worker. The member information may include, for example, the type, model, stock quantity, and the like of the member. Further, the member information may include the type, model, vendor name, quantity, humidity management level, expiration date, and the like of component 91 accommodated in component container 21.

Display device 33 of the embodiment includes a touch panel, and display device 33 also functions as an input device of receiving various operations by the worker. For example, the worker can designate desired component container 21 to be unloaded from storage cabinet 30 by using display device 33 functioning as an input device. In this case, control device 32 unloads designated component container 21.

The above description of component container 21 can be similarly applied to at least an accommodation case accommodating at least one component container 21. However, in this case, when accommodating component container 21 in the accommodation case, the worker reads the identification code attached to the accommodation case and the identification code attached to component container 21 by using the code reader or the like of mobile terminal 82*c*. Accordingly, the identification information for identifying the accommodation case and the identification information for identifying component container 21 are associated with each other and stored in the storage device of component management device 70.

When the accommodation case is loaded, reading device 31 reads the identification code attached to the accommodation case to acquire identification information for identifying the loaded accommodation case. Control device 32 acquires the identification information of component container 21 accommodated in the accommodation case loaded in storage cabinet 30 from the correspondence relationship of the identification information stored in the storage device of component management device 70. Accordingly, control device 32 can recognize component container 21 accommodated in the accommodation case loaded in storage cabinet 30.

Figure 3C:
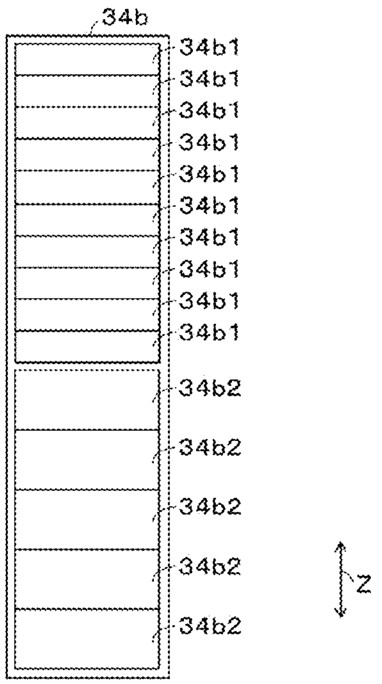
FIG. 3C is a front view illustrating an example of a storage unit of the storage cabinet illustrated in FIG. 3A.

Storage section 34 may take various forms as long as storage section 34 can accommodate component container 21 or the accommodation case. As illustrated in FIG. 3B, storage section 34 of the embodiment includes multiple storage units 34*b*, and multiple storage units 34*b* are arranged in a circular shape when viewed in the vertical direction (Z-axis direction). Further, as illustrated in FIG. 3C, storage unit 34*b* includes, for example, two types of storage spaces, storage space 34*b*1 and storage space 34*b*2.

Multiple storage spaces 34*b*1 and multiple storage spaces 34*b*2 may be provided along the vertical direction (Z-axis direction). For example, the size (width dimension, depth dimension, and height dimension) of storage space 34*b*1 is set to store component container 21. The size (width dimension, depth dimension, and height dimension) of storage space 34*b*2 is set to store an accommodation case accommodating component container 21.

Transfer device 35 is provided inside multiple storage units 34*b* when viewed in the vertical direction (Z-axis direction), and grips and moves component container 21 or the accommodation case. Transfer device 35 may take various forms as long as transfer device 35 can grip and move component container 21 or the accommodation case. For example, a robot arm (an articulated robot), a lifting and lowering slide mechanism, and the like may be used for transfer device 35.

In transfer device 35, a gripper grips component container 21 or the accommodation case carried into work space 34*a* from loading port 30*a* during loading. Transfer device 35 moves the gripper to a predetermined storage space and releases the gripping of component container 21 or the accommodation case by the gripper. Thus, component container 21 or the accommodation case is stored in a predetermined storage space. Further, in transfer device 35, the gripper grips component container 21 or the accommodation case accommodated in a predetermined storage space during unloading. Transfer device 35 moves the gripper to work space 34*a* and releases the gripping of component container 21 or the accommodation case by the gripper. Accordingly, component container 21 or the accommodation case can be carried out. The carry-in and carry-out of component container 21 or the accommodation case may be performed by the worker or may be performed by an automated guided vehicle or the like.

For example, components 91 accommodated in component container 21 include resin-sealed component 91. When the component which is exposed to the atmosphere for more than a defined time and absorbs moisture in the atmosphere is heated in reflow oven 10*d* illustrated in FIG. 1, the moisture contained in the component may evaporate and expand in volume, leading to damage. Such component 91 having high humidity sensitivity is referred to as a moisture sensitivity device (MSD) component, and the time during which the component can be exposed to the atmosphere for each component type (the time during which the component can be used in production) is defined.

In the present description, component 91 that is mounted on board 90 and requires humidity management is referred to as management target component 91*t*. Storage cabinet 30 of the embodiment includes humidity adjustment device 36. Humidity adjustment device 36 can maintain storage section 34 at a predetermined atmospheric humidity (below the predetermined humidity defined by the humidity management level of management target component 91*t*), and storage cabinet 30 can store management target component 91*t* at the predetermined atmospheric humidity. Therefore, by storing management target component 91*t* in storage cabinet 30, it is possible to stop the decrease in the remaining time during which management target component 91*t* can be used in production.

Further, storage cabinet 30 of the embodiment includes temperature adjustment device 37. Temperature adjustment device 37 can maintain storage section 34 at a predetermined atmospheric temperature (a predetermined temperature defined by the humidity management level of management target component 91*t*), and storage cabinet 30 can store management target component 91*t* at the predetermined atmospheric temperature. The atmospheric temperature in the room of the production facility is often maintained at the predetermined temperature defined by the humidity management level of management target component 91*t*. In this case, temperature adjustment device 37 may be omitted from storage cabinet 30.

1-4. Feeder Rack 40, Desiccator 50*a*, Oven 50*b*, Component Supply Device 60, and Work Table 10*t*

Feeder rack 40 is component holding unit 80*u*. Component holding unit 80*u* temporarily stores component container 21 which is unloaded from storage cabinet 30 and is not yet used for production of board product 900 or component container 21 which is no longer needed after the production of board product 900 ends. In this case, component container 21 is feeder 22*a* in which reel 21*a* around which component tape 21*a*2 accommodating component 91 is wound is rotatably supported.

Figure 4:
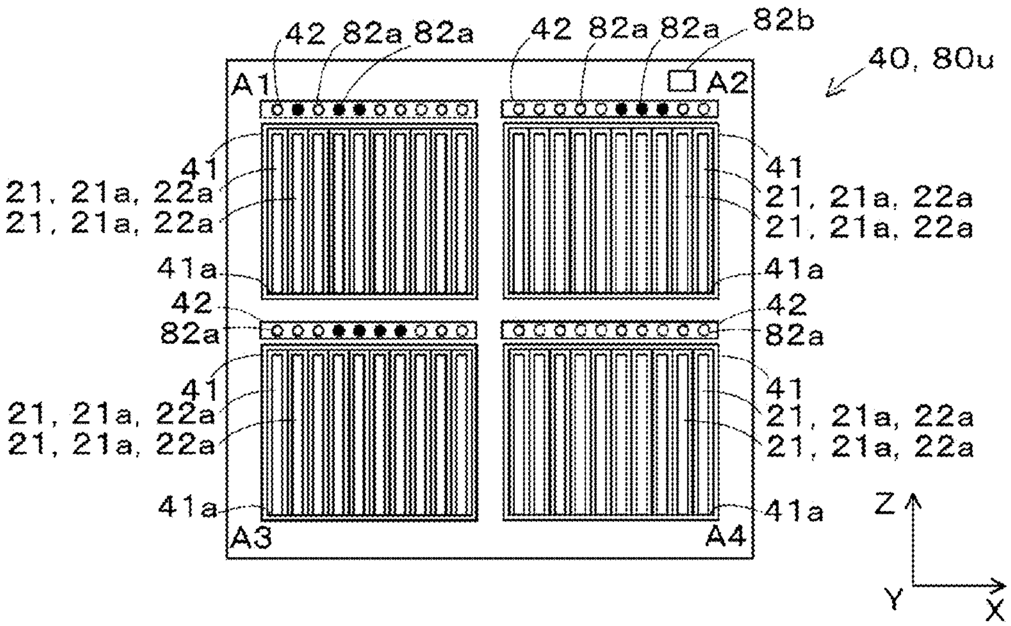
FIG. 4 is a front view illustrating an example of a feeder rack.

In feeder rack 40, unlike storage cabinet 30, storage region 41 of feeder 22*a* is not sealed, and feeder 22*a* is exposed to the atmosphere. That is, feeder rack 40 can store feeder 22*a* at the atmospheric temperature and the atmospheric humidity in the room of the production facility. For example, as illustrated in FIG. 4, feeder rack 40 includes at least one storage region 41 (in FIG. 4, storage regions A1 to A4 are illustrated so that four storage regions 41 can be identified). Each of at least one storage region 41 (four storage regions A1 to A4) includes multiple slots 41*a*, and each of multiple slots 41*a* can hold one feeder 22*a*.

Further, each of at least one storage region 41 (four storage regions A1 to A4) includes storage position identification section 42. Storage position identification section 42 is assigned a slot number capable of identifying multiple slots 41*a* provided in one storage region 41. Storage position identification section 42 is provided at a portion of feeder rack 40 where the storage position at which feeder 22*a* is stored can be identified (for example, in FIG. 4, an upper portion of an insertion port through which feeder 22*a* is inserted into slot 41*a*).

Further, storage position identification section 42 is provided with indicator 82*a*. A light emission state (lighting, extinction, blinking, display color, and the like) of indicator 82*a* is controlled according to feeder 22*a* held in slot 41*a*. For example, feeder rack 40 can notify the worker of feeder 22*a* to be conveyed by lighting indicator 82*a* corresponding to slot 41*a* in which feeder 22*a* to be conveyed to the worker is held in a specific color. The arrangement and number of storage regions 41 and the accommodation form of feeder 22*a* are not limited, and various forms may be adopted. For example, feeder rack 40 may include storage region 41 capable of storing an accommodation case accommodating feeder 22*a*.

Desiccator 50*a* includes a humidity control section that maintains the inside of desiccator 50*a* at a predetermined atmospheric humidity, and can store component container 21 or the accommodation case at the predetermined atmospheric humidity. Desiccator 50*a* can store management target component 91*t* at the atmospheric humidity defined by the humidity management level of management target component 91*t*. Therefore, similarly to storage cabinet 30, by storing management target component 91*t* in desiccator 50*a*, it is possible to stop the decrease in the remaining time during which management target component 91*t* can be used in production.

When the remaining time during which management target component 91*t* can be used in production is exceeded, by drying at a predetermined atmospheric temperature for a predetermined time, it is possible to recover the remaining time during which management target component 91*t* can be used in production. The predetermined atmospheric temperature, the predetermined time, and the number of times of drying are defined for each humidity management level of management target component 91*t*.

Oven 50*b* includes a drying section that dries and maintains the inside of oven 50*b* to a predetermined atmospheric humidity, and can dry component container 21 or management target component 91*t* accommodated in the accommodation case to a predetermined humidity and store the same at the predetermined atmospheric humidity. Oven 50*b* can dry and store management target component 91*t* under the condition defined by the humidity management level of management target component 91*t*. Therefore, by storing management target component 91*t* in oven 50*b*, it is possible to recover the remaining time during which management target component 91*t* can be used in production.

Figure 5:
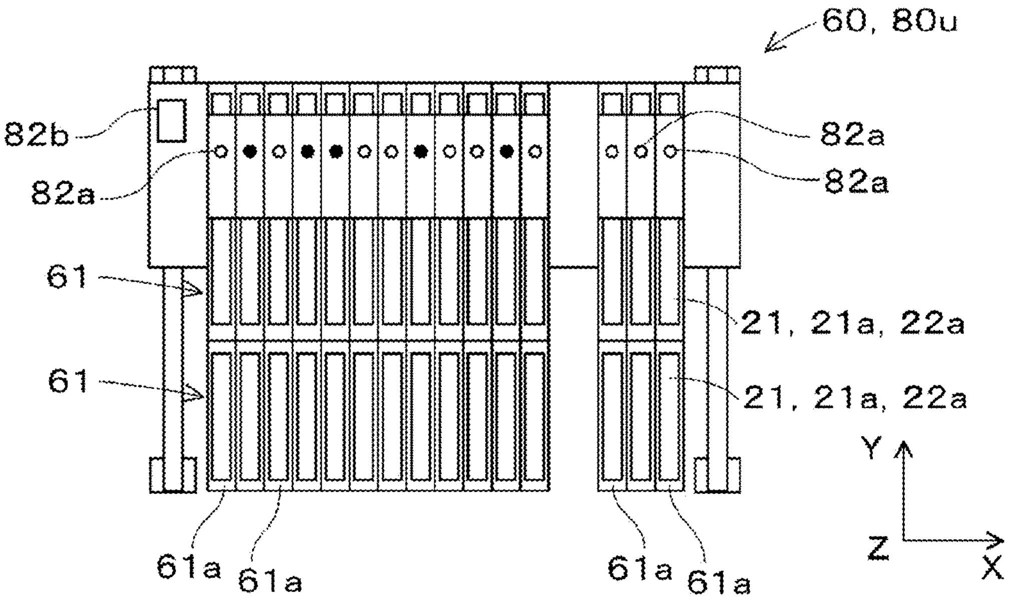
FIG. 5 is a plan view illustrating an example of a component supply device.

Component supply device 60 supplies component 91 to be mounted on board 90. As described above, component supply device 60 can supply components 91 by using, for example, feeder 22*a* equipped with reel 21*a* illustrated in FIG. 2A, tray pallet 22*b* equipped with component tray 21*b* illustrated in FIG. 2B, and the like. As illustrated in FIG. 5, component supply device 60 of the embodiment can supply component 91 by using feeder 22*a*. Further, component supply device 60 illustrated in FIGS. 1 and 5 is component holding unit 80*u* that is detachably provided with respect to component mounter 10*c*.

As illustrated in FIG. 5, component supply device 60 includes at least one storage region 61 (two storage regions 61 in the upper and lower stages in FIG. 5). Each of at least one storage region 61 (two storage regions 61 in the upper and lower stages) includes multiple slots 61*a*, and each of multiple slots 61*a* can hold one feeder 22*a*. Further, for example, multiple slots 61*a* of storage region 61 in the upper stage are provided with indicator 82*a* similar to indicator 82*a* described above. Specifically, indicator 82*a* is provided at a portion (for example, in FIG. 5, an upper portion of feeder 22*a* held in slot 61*a*) capable of identifying a storage position where feeder 22*a* is stored in component supply device 60.

On work table 10*t*, the worker can perform various kinds of work. Specifically, work table 10*t* includes flat plate-shaped work space 10*w* on a desk. For example, the worker can place component container 21 in work space 10*w* and perform various kinds of work described later. Further, work table 10*t* is provided with indicator 82*a* similar to indicator 82*a* described above.

1-5. Component Management Device 70

Component management device 70 manages the location of component 91. Specifically, component management device 70 manages the location of component container 21 accommodating component 91. The production facility illustrated in FIG. 1 includes warehouse area ZA1, picking area ZA2, external setup area ZA3, and pre-line setup area ZA4. Compared to picking area ZA2, warehouse area ZA1 is a region in which component container 21 accommodating components 91 is stored for a long period, and includes at least one (one in FIG. 1) storage cabinet 30.

Picking area ZA2 is a region for temporarily storing component container 21 accommodating components 91, and includes at least one (one in FIG. 1) feeder rack 40. Picking area ZA2 may also include at least one (one in FIG. 1) desiccator 50*a*, at least one (one in FIG. 1) component supply device 60, and at least one (one in FIG. 1) work table 10*t*. Component container 21 stored in storage cabinet 30 of warehouse area ZA1 is conveyed to picking area ZA2. Component container 21 stored in storage cabinet 30 of warehouse area ZA1 can also be conveyed to external setup area ZA3.

In external setup area ZA3, the worker can perform various kinds of work. External setup area ZA3 includes at least one (one in FIG. 1) feeder rack 40. External setup area ZA3 may also include at least one (one in FIG. 1) desiccator 50*a*, at least one (one in FIG. 1) oven 50*b*, at least one (one in FIG. 1) component supply device 60, and at least one (one in FIG. 1) work table 10*t*. Component container 21 conveyed from warehouse area ZA1 or picking area ZA2 can be temporarily stored in these devices.

In external setup area ZA3, for example, supply preparation work is performed in which reel 21*a* and feeder 22*a* are combined to enable supply to board work line 10L. For example, worker mounts reel 21*a* on feeder 22*a*. At this time, the worker reads identification code 23*a* attached to reel 21*a* by using, for example, a code reader of mobile terminal 82*c*. Further, the worker reads identification code 24*a* attached to feeder 22*a* by using a code reader or the like of mobile terminal 82*c*.

Accordingly, identification information for identifying reel 21*a* and identification information for identifying feeder 22*a* are transmitted to component management device 70. When the identification information is acquired, component management device 70 stores the identification information of reel 21*a* and the identification information of feeder 22*a* in the storage device in association with each other. Further, for example, when component container 21 is moved, component management device 70 updates the location information of component container 21.

For example, when moving reel 21*a*, the worker reads identification code 23*a* by using a code reader or the like of mobile terminal 82*c*. When mobile terminal 82*c* has a positioning function, mobile terminal 82*c* reads the identification code 23*a* and transmits the location information of reel 21*a* to component management device 70. Component management device 70 updates the location information of reel 21*a* stored in the storage device to the received location information. Similarly, for example, component management device 70 can update the location information of feeder 22*a* when feeder 22*a* is moved.

When the supply preparation work ends, component container 21 is conveyed to pre-line setup area ZA4. In pre-line setup area ZA4, the worker or the conveyance device can supply component container 21 to component mounter 10*c* and collect component container 21 from component mounter 10*c*. Further, the pre-line setup area ZA4 includes at least one (one in FIG. 1) feeder rack 40. Pre-line setup area ZA4 may include at least one (one in FIG. 1) component supply device 60 and at least one (one in FIG. 1) work table 10*t*.

Feeder rack 40 and component supply device 60 can temporarily store feeder 22*a* which is not yet used for production of board product 900 or feeder 22*a* which is no longer needed after the production of board product 900 ends. Feeder 22*a* that is no longer needed after the production of board product 900 ends is conveyed to external setup area ZA3. When the time until feeder 22*a* is used in the production of next board product 900 is less than a predetermined time, feeder 22*a* is stored in picking area ZA2 or external setup area ZA3. When the time is equal to or more than the predetermined time, feeder 22*a* is stored in warehouse area ZA1.

Further, component management device 70 can manage the remaining time from when management target component 91*t* is exposed to the atmosphere to when the defined time available for production is reached. As described above, when exposed to the atmosphere, management target component 91*t* absorbs moisture in the atmosphere and the remaining time decreases. Therefore, component management device 70 may start to decrease the remaining time when the packaging of management target component 91*t* is opened in loading section 20 and predetermined work is performed. For example, the worker attaches an identification code (for example, identification code 23*a* attached to reel 21*a*) to component container 21 accommodating component 91.

Then, the worker reads the identification code attached to component container 21 by using a code reader or the like of mobile terminal 82*c*. Accordingly, the identification information for identifying component container 21 accommodating component 91 is transmitted to component management device 70 and stored in the storage device of component management device 70. For example, component management device 70 determines whether component 91 accommodated in component container 21 is management target component 91*t* by referring to a database in which information related to component 91 is stored. When component 91 is management target component 91*t*, component management device 70 stores information (for example, a flag) indicating that component 91 is management target component 91*t*, identification information, a humidity management level, and the like in the storage device, and starts to decrease the remaining time.

Further, while management target component 91*t* is stored in storage cabinet 30 or desiccator 50*a*, component management device 70 stops the decrease in the remaining time during which management target component 91*t* can be used in production. Further, when management target component 91*t* is stored in oven 50*b* or when the baking processing is executed in storage cabinet 30, component management device 70 resets the remaining time during which management target component 91*t* can be used in production (sets the remaining time to a defined time available for production), increases the number of times of drying by one time, and stores management target component 91*t* in the storage device.

1-6. Component Notification Device 80

Component container 21 accommodating component 91 moves in the production facility illustrated in FIG. 1. Therefore, when component container 21 is unloaded from storage cabinet 30, management target component 91*t* requiring humidity management may not be stored in an appropriate storage place. If management target component 91*t* is not stored in an appropriate storage place, the remaining time during which management target component 91*t* can be used for production may continue to decrease, and management target component 91*t* may not be used in production. Further, there is a possibility that work of recovering the remaining time during which management target component 91*t* can be used in production by oven 50*b* or the like is required.

Here, in the embodiment, component notification device 80 is provided. Component notification device 80 includes determination section 81 and notification section 82. Determination section 81 and notification section 82 can be provided in various control devices. For example, at least one of determination section 81 and notification section 82 can be provided in feeder rack 40. At least one of determination section 81 and notification section 82 may be provided in component supply device 60. At least one of determination section 81 and notification section 82 may be provided in work table 10*t*.

At least one of determination section 81 and notification section 82 may be provided in component supply device 60 provided in component mounter 10*c*. At least one of determination section 81 and notification section 82 may be provided in management device 19. At least one of determination section 81 and notification section 82 may be provided in component management device 70. At least one of determination section 81 and notification section 82 may be formed on a cloud.

Figure 7:
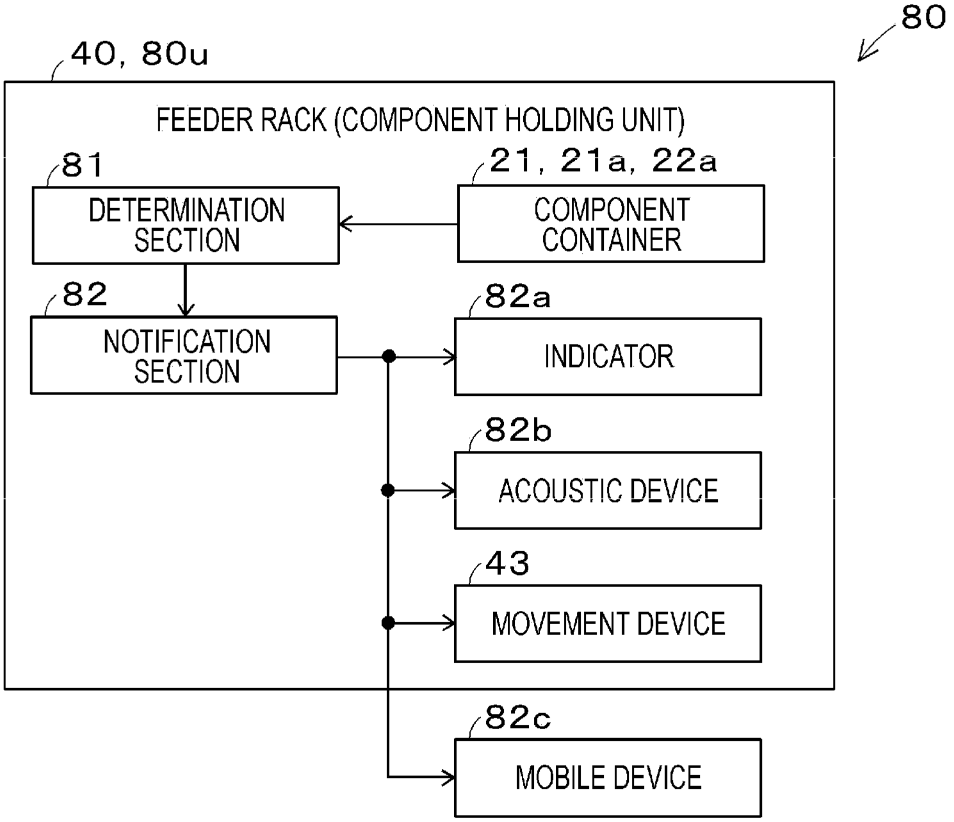
FIG. 7 is a block view illustrating an example of a control block of a component notification device.

As illustrated in FIG. 7, in component notification device 80 of the embodiment, both determination section 81 and notification section 82 are provided in feeder rack 40. As described above, feeder rack 40 is component holding unit 80*u*. Further, component notification device 80 executes a control in accordance with a flowchart illustrated in FIG. 8. Determination section 81 performs the processing and determination illustrated in step S11 and step S12. Notification section 82 performs the processing illustrated in step S13.

1-6-1. Determination Section 81

When component container 21 accommodating component 91 to be mounted on board 90 is exposed to the atmosphere, determination section 81 determines whether component 91 accommodated in component container 21 is management target component 91*t* requiring humidity management. Determination section 81 may take various forms as long as determination section 81 can determine whether component 91 accommodated in component container 21 is management target component 91*t*.

For example, as illustrated in FIG. 4, it is assumed that feeder 22*a* is stored in feeder rack 40. In this case, feeder 22*a* is exposed to the atmosphere. When feeder 22*a* is stored in feeder rack 40, determination section 81 can determine whether component 91 accommodated in feeder 22*a* is management target component 91*t*. Specifically, determination section 81 acquires the identification information of feeder 22*a* (step S11 illustrated in FIG. 8). When feeder 22*a* is held in slot 41*a*, the connector of feeder 22*a* is connected to the connector of feeder rack 40. Accordingly, feeder 22*a* is supplied with power from feeder rack 40 via the connector, and can communicate with the control device of feeder rack 40.

Determination section 81 provided in feeder rack 40 can communicate with feeder 22*a* to acquire the identification information of feeder 22*a*. Then, determination section 81 determines whether component 91 accommodated in feeder 22*a* is management target component 91*t* (step S12 illustrated in FIG. 8). As described above, the identification information of feeder 22*a* and the identification information of reel 21*a* are stored in association with each other in the storage device of component management device 70. Further, the storage device stores information related to management target component 91*t*.

Accordingly, determination section 81 can determine whether component 91 accommodated in feeder 22*a* is management target component 91*t* by referring to the storage device of component management device 70. Further, when component 91 accommodated in feeder 22*a* is management target component 91*t*, determination section 81 can also acquire the humidity management level, the remaining time during which management target component 91*t* can be used in production, and the like.

As illustrated in FIG. 5, it is assumed that feeder 22*a* is stored in component supply device 60. Also in this case, feeder 22*a* is exposed to the atmosphere. Similarly to the case of feeder rack 40, when feeder 22*a* is stored in component supply device 60, determination section 81 provided in component supply device 60 can determine whether component 91 accommodated in feeder 22*a* is management target component 91*t*. As described above, when component container 21 is stored in component holding unit 80*u*, determination section 81 can determine whether component 91 accommodated in component container 21 is management target component 91*t*.

Figure 6:
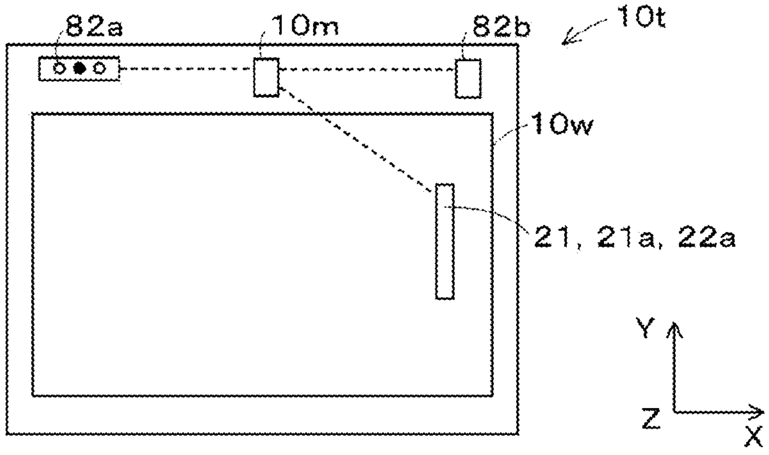
FIG. 6 is a plan view illustrating an example of a work table.

As illustrated in FIG. 6, it is assumed that component container 21 is left on work table 10*t*. Also in this case, feeder 22*a* is exposed to the atmosphere. For example, a wireless tag is attached to component container 21 illustrated in FIG. 6. Work table 10*t* includes wireless device 10*m* capable of wirelessly communicating with the wireless tag. Determination section 81 provided in work table 10*t* can acquire the identification information of feeder 22*a* by wirelessly communicating with feeder 22*a* with wireless device 10*m*. Similarly to the case of feeder rack 40, when component container 21 is left on work table 10*t*, determination section 81 can determine whether component 91 accommodated in feeder 22*a* is management target component 91*t*. Work table 10*t* may include multiple directional wireless devices 10*m*. In this case, determination section 81 can also recognize the position where component container 21 is left on the work table 10*t*.

1-6-2: Notification Section 82

Figure 8:
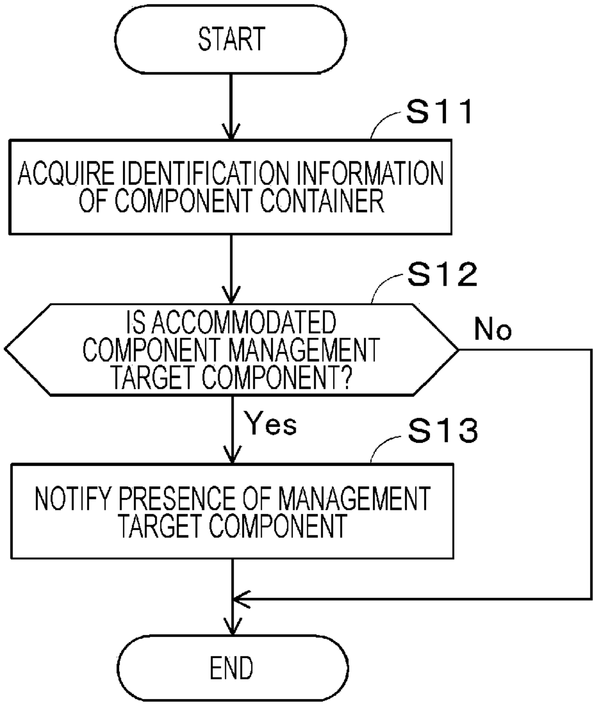
FIG. 8 is a flowchart illustrating an example of a control procedure executed by the component notification device.

When determination section 81 determines that component 91 is management target component 91*t*, notification section 82 notifies the presence of management target component 91*t* through at least one of the visual, auditory, and tactile senses of the worker (step S13 illustrated in FIG. 8). Notification section 82 may take various forms as long as notification section 82 can notify of the presence of management target component 91*t* through at least one of the visual sense, auditory sense, and tactile sense of the worker.

When determination section 81 determines that component 91 is management target component 91*t*, notification section 82 can notify the worker of the presence of management target component 91*t* by lighting or blinking indicator 82*a* in a predetermined color. For example, as illustrated in FIG. 4, it is assumed that feeder 22*a* accommodating management target component 91*t* is stored in feeder rack 40. As described above, feeder rack 40 is provided with indicator 82*a*. Indicator 82*a* only needs to emit light of a predetermined color, and a known indicator such as a light emitting diode may be used.

Notification section 82 lights or blinks at least one indicator 82*a* in a predetermined color to notify the worker of the presence of management target component 91*t*. In FIG. 4, indicator 82*a* that is lighted or blinks in a predetermined color is represented by a black circle, and another indicator 82*a* is represented by a white circle. Further, for example, it is assumed that feeder 22*a* accommodating management target component 91*t* is stored in storage region A1 illustrated in FIG. 4. In this case, notification section 82 can notify the worker of the presence of management target component 91*t* by lighting or blinking at least one indicator 82*a* provided in storage region A1 in a predetermined color.

Further, indicator 82*a* illustrated in FIG. 4 is provided at a portion of feeder rack 40 where the storage position where feeder 22*a* is stored can be identified (for example, in FIG. 4, an upper portion of an insertion port where feeder 22*a* is inserted into slot 41*a*). In this case, notification section 82 can cause indicator 82*a* corresponding to the storage position where feeder 22*a* accommodating management target component 91*t* is stored to emit light. For example, feeder 22*a* held in second slot 41*a* from the left side of the paper surface of storage region A1 accommodates management target component 91*t*. In this case, notification section 82 causes indicator 82*a* provided at the upper portion of the insertion port of feeder 22*a* to emit light.

In either case, the predetermined color for causing indicator 82*a* to emit light may be set freely. For example, the predetermined color may be set to a color different from the color for the work instruction described above. Further, the predetermined color may be set and changed by the user of feeder rack 40. The above description of indicator 82*a* provided in feeder rack 40 can be similarly applied to indicator 82*a* provided in component supply device 60, and indicator 82*a* provided on work table 10*t*.

When determination section 81 determines that component 91 is management target component 91*t*, notification section 82 can output a predetermined sound from acoustic device 82*b* to notify the worker of the presence of management target component 91*t*. For example, as illustrated in FIG. 4, it is assumed that feeder 22*a* accommodating management target component 91*t* is stored in feeder rack 40. Feeder rack 40 is provided with acoustic device 82*b*. As acoustic device 82*b*, any known acoustic device such as a speaker may be used as long as the acoustic device can emit a predetermined sound. Notification section 82 outputs a predetermined sound from acoustic device 82*b* to notify the worker of the presence of management target component 91*t*.

The predetermined sound output from acoustic device 82*b* may be set freely. For example, the predetermined sound may be a mechanical sound such as a beep sound. The predetermined sound may be a sound of a predetermined scale such as a melody. The predetermined sound may be voice. When the predetermined sound is voice, notification section 82 easily notifies storage region 41 in which feeder 22*a* accommodating management target component 91*t* is stored, a position in storage region 41, and the like. Further, the predetermined sound can be set and changed by the user of feeder rack 40. The above description of acoustic device 82*b* provided in feeder rack 40 can be similarly applied to acoustic device 82*b* provided in component supply device 60, and acoustic device 82*b* provided in work table 10*t*.

When determination section 81 determines that component 91 is management target component 91*t*, notification section 82 can notify the worker of the presence of management target component 91*t* by using mobile terminal 82*c* carried by the worker. Mobile terminal 82*c* is not limited as long as mobile terminal 82*c* is a terminal carried by the worker. For example, notification section 82 can display the presence of management target component 91*t* on mobile terminal 82*c* and notify the worker of the presence of management target component 91*t*. Notification section 82 can display the presence of management target component 91*t* by, for example, characters, figures, symbols, model views, images, or moving images. Notification section 82 can also display, on mobile terminal 82*c*, a place where component container 21 accommodating management target component 91*t* is stored or left.

Notification section 82 can notify a storage region in which component container 21 accommodating management target component 91*t* is stored, a position in the storage region, or the like. Further, notification section 82 can also output a predetermined sound from mobile terminal 82*c* to notify the worker of the presence of management target component 91*t*. The above description of acoustic device 82*b* can be similarly applied to a case where a predetermined sound is output from mobile terminal 82*c*. Further, notification section 82 can also vibrate mobile terminal 82*c* to notify the worker of management target component 91*t*. Notification section 82 can also notify the worker of presence of management target component 91*t* by combining the forms described above by using mobile terminal 82*c*.

Figure 9:
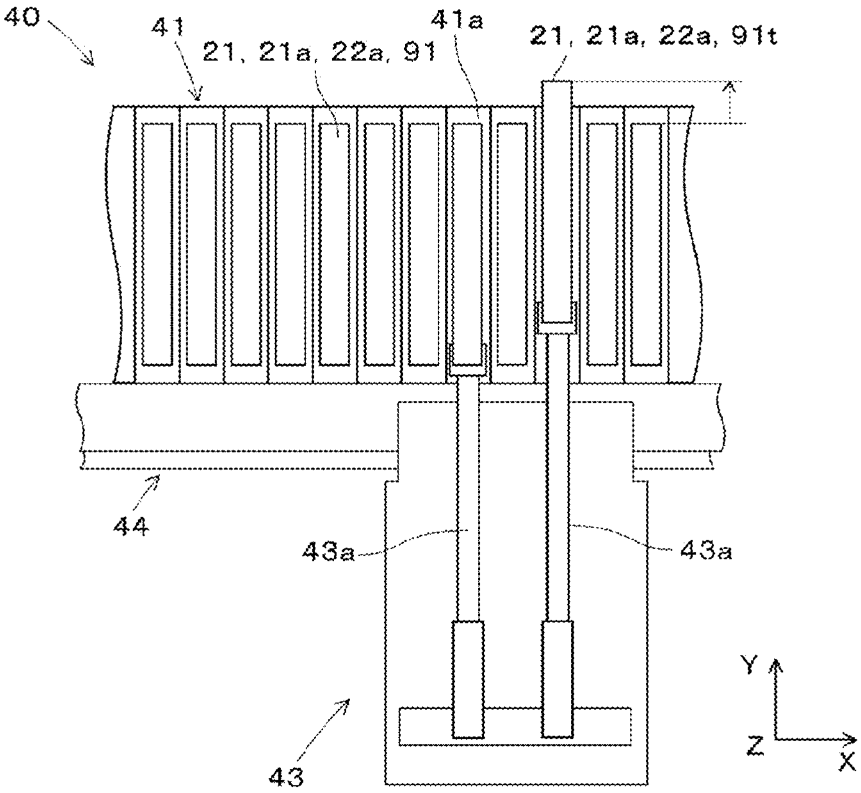
FIG. 9 is a plan view illustrating an example of a movement device.

When determination section 81 determines that component 91 is management target component 91*t*, notification section 82 may cause component container 21 accommodating management target component 91*t* to protrude from the holding position to notify the worker of the presence of management target component 91*t*. For example, as illustrated in FIG. 4, it is assumed that feeder 22*a* accommodating management target component 91*t* is stored in feeder rack 40. In this case, as illustrated in FIG. 9, feeder rack 40 includes movement device 43 and trajectory member 44. Movement device 43 is provided to be able to move (travel) trajectory member 44. Trajectory member 44 is provided along the arrangement direction of slots 41*a* (X-axis direction in FIG. 9).

Movement device 43 includes at least one (two in FIG. 9 for convenience of illustration) holding section 43*a*. Holding section 43*a* can clamp feeder 22*a*. Holding section 43*a* is movable along the attachment/detachment direction (Y-axis direction in FIG. 9) of feeder 22*a* by, for example, a linear motion mechanism or the like, and can move feeder 22*a* along the attachment/detachment direction (Y-axis direction). Movement device 43 can move to slot 41*a* in which feeder 22*a* accommodating management target component 91*t* is stored, clamp feeder 22*a* by using holding section 43*a*, and move feeder 22*a* along the attachment/detachment direction (Y-axis direction). When movement device 43 includes the same number of holding sections 43*a* as multiple slots 41*a* provided in one storage region 41, trajectory member 44 may be omitted.

As described above, when determination section 81 determines that component 91 is management target component 91*t*, notification section 82 can cause feeder 22*a* accommodating management target component 91*t* to protrude from the holding position by using movement device 43 to notify the worker of the presence of the management target component 91*t*. In FIG. 9, a state in which feeder 22*a* accommodating management target component 91*t* protrudes from the holding position by a predetermined amount is indicated by an arrow. When the worker approaches feeder rack 40 to a predetermined distance, notification section 82 can cause feeder 22*a* accommodating management target component 91*t* to protrude from the holding position. Further, when the worker performs a predetermined operation, notification section 82 can cause feeder 22*a* accommodating management target component 91*t* to protrude from the holding position. The above description of feeder rack 40 can be similarly applied to component supply device 60.

Further, notification section 82 can employ the following notification method in any of the forms described above. In the following notification method, indicator 82*a* is described as an example, but the notification method can be similarly applied to acoustic device 82*b*, mobile terminal 82*c*, movement device 43, and the like. For example, as the remaining time from when management target component 91*t* is exposed to the atmosphere to when the defined time available for production is reached is shorter, it is necessary to store management target component 91*t* in an appropriate storage place within a short time, and it is necessary to alert the worker. Here, when the remaining time from when management target component 91*t* is exposed to the atmosphere to when the defined time available for production is reached is less than a predetermined time, notification section 82 can change a notification method of management target component 91*t*, compared to a case where the remaining time is equal to or more than the predetermined time.

For example, notification section 82 changes the color of lighting or blinking indicator 82*a* when the remaining time is less than the predetermined time, compared to a case where the remaining time is equal to or more than the predetermined time. For example, when the remaining time is less than a predetermined time, notification section 82 can light or blink indicator 82*a* in a color having a relatively high chroma such as red or yellow, and when the remaining time is equal to or more than the predetermined time, notification section 82 can light or blink indicator 82*a* in a color having a relatively low chroma such as gray. In addition, when the remaining time is less than the predetermined time, notification section 82 can shorten the blinking cycle of indicator 82*a* compared to a case where the remaining time is equal to or more than the predetermined time.

The predetermined time can be set freely. For example, the predetermined time may be set to zero. In this case, notification section 82 can change the notification method of management target component 91*t* for which the remaining time is reached the defined time available for production and for which the remaining time has elapsed, compared to the notification method of management target component 91*t* for which the remaining time has not elapsed. Further, when the remaining time from when management target component 91*t* is exposed to the atmosphere to when the defined time available for production is reached has elapsed, notification section 82 can also notify whether management target component 91*t* can be subjected to the baking processing. Information as to whether management target component 91*t* can be subjected to the baking processing is stored in, for example, the storage device of component management device 70.

As the humidity management level defined for management target component 91*t* becomes higher, the initial remaining time is shorter, and it is necessary to store management target component 91*t* in an appropriate storage place within a short time, and it is necessary to alert the worker. Here, when the humidity management level defined for management target component 91*t* is equal to or more than a predetermined level, notification section 82 can change the notification method of management target component 91*t* compared to management target component 91*t* having the humidity management level less than the predetermined level. For example, notification section 82 changes the predetermined color for lighting or blinking indicator 82*a* that notifies the presence of management target component 91*t* having the humidity management level equal to or more than a predetermined level, compared to indicator 82*a* that notifies the presence of management target component 91*t* having a humidity management level less than the predetermined level.

Further, when there are multiple management target components 91*t* having the same humidity management level, notification section 82 may light or blink multiple indicators 82*a* that notify of the presence of management target components 91*t* in the same color. Further, when there are multiple management target components 91*t* having the same humidity management level, notification section 82 can match the cycle of blinking multiple indicators 82*a* that notify of the presence of management target components 91*t*.

When multiple desiccators 50*a* capable of storing component containers 21 accommodating management target components 91*t* under the condition defined by the humidity management level of management target components 91*t* are provided, notification section 82 can notify desiccators 50*a* that store component containers 21 accommodating management target components 91*t*. For example, in the production facility illustrated in FIG. 1, picking area ZA2 includes one desiccator 50*a*, and external setup area ZA3 includes one desiccator 50*a*. Desiccator 50*a* may include indicator 82*a* similar to indicator 82*a* described above.

In this case, notification section 82 can light or blink indicator 82*a* provided in desiccator 50*a* that stores component container 21 accommodating management target component 91*t*. Further, notification section 82 can match the notification method of management target component 91*t* with the notification method of desiccator 50*a* that stores component container 21 accommodating management target component 91*t*. For example, notification section 82 lights or blinks indicator 82*a* provided in feeder rack 40 in a predetermined color, and notifies the worker of the presence of management target component 91*t*. Notification section 82 notifies desiccator 50*a* by lighting or blinking indicator 82*a* provided in desiccator 50*a* that stores feeder 22*a* accommodating management target component 91*t* in the same color as the predetermined color.

2. Feeder Rack 40 and Other Forms Thereof

Component container 21 of the embodiment is feeder 22*a* in which reel 21*a* around which component tape 21*a*2 accommodating component 91 is wound is rotatably supported. Further, feeder rack 40 is component holding unit 80*u* that includes component notification device 80 and temporarily stores feeder 22*a* which is unloaded from storage cabinet 30 and is not yet used for production of board product 900 or feeder 22*a* which is no longer needed after the production of board product 900 ends. Component notification device 80 may be in any form described above.

Similarly, component supply device 60 is a component holding unit 80*u* which includes component notification device 80 and temporarily stores feeder 22*a* which is unloaded from storage cabinet 30 and is not yet used for production of board product 900 or feeder 22*a* which is no longer needed after the production of board product 900 ends. Component notification device 80 may be in any form described above. Further, component supply device 60 may be provided in component mounter 10*c*. Further, component container 21 may be reel 21*a* around which component tape 21*a*2 accommodating component 91 is wound. Feeder rack 40 in this case corresponds to a reel rack. In the description of the reel rack, feeder 22*a* in the description of feeder rack 40 is replaced with reel 21*a*. Further, in any of the embodiments described above, component container 21 may be component tray 21*b* illustrated in FIG. 2B or tray pallet 22*b* equipped with component tray 21*b*.

3. Component Notification Method

The above description of component notification device 80 can be similarly applied to a component notification method. Specifically, the component notification method includes a determination step and a notification step. The control performed by determination section 81 corresponds to the determination step. The control performed by notification section 82 corresponds to the notification step.

4. Example of Advantageous Effects of Embodiment

According to component notification device 80, determination section 81 and notification section 82 are provided. Accordingly, component notification device 80 can notify of the presence of management target component 91*t* requiring humidity management through at least one of visual, auditory, and tactile senses of the worker. The above description of component notification device 80 can be similarly applied to feeder rack 40 and the component notification method.

REFERENCE SIGNS LIST

21: component container, 21*a*: reel, 21*a*2: component tape, 22*a*: feeder, 30: storage, 40: feeder rack, 50*a*: desiccator, 80: component notification device, 80*u*: component holding unit, 81: determination section, 82: notification section, 82*a*: indicator, 82*b*: acoustic device, 82*c*: mobile terminal, 90: board, 91: component, 91*t*: management target component, 900: board product

The invention claimed is:

1. A component notification device comprising:

a determination section configured to, when a component container accommodating a component to be mounted on a board is stored in a component holding unit configured to temporarily store the component container exposed to an atmosphere, determine whether the component accommodated in the component container is a management target component requiring humidity management; and a notification section configured to notify of presence of the management target component through at least one of visual, auditory, and tactile senses of a worker when the determination section determines that the component is the management target component, wherein when the determination section determines that the component is the management target component, the notification section lights or blinks an indicator provided at a portion of the component holding unit, at which a storage position where the component container is stored can be identified, and the notification section causes the indicator corresponding to the storage position at which the component container accommodating the management target component is stored to emit light.

2. The component notification device according to claim 1, wherein the determination section determines whether the component accommodated in the component container is the management target component when the component container is stored in a component holding unit configured to temporarily store the component container which is unloaded from a storage cabinet and is not yet used for production of a board product or the component container which is no longer needed after the production of the board product ends.

3. The component notification device according to claim 1, wherein the notification section lights or blinks the indicator in a predetermined color to notify the worker of the presence of the management target component.

4. The component notification device according to claim 3, wherein the component holding unit is configured to temporarily store the component container which is unloaded from a storage cabinet and is not yet used for production of a board product or the component container which is no longer needed after the production of the board product ends.

5. The component notification device according to claim 1, wherein when the determination section determines that the component is the management target component, the notification section outputs a predetermined sound from an acoustic device to notify the worker of the presence of the management target component.

6. The component notification device according to claim 1, wherein when the determination section determines that the component is the management target component, the notification section notifies the worker of the presence of the management target component by using a mobile terminal carried by the worker.

7. The component notification device according to claim 6, wherein the notification section vibrates the mobile terminal to notify the worker of the presence of the management target component.

8. The component notification device according to claim 1, wherein when a remaining time from when the management target component is exposed to the atmosphere to when a defined time available for production is reached is less than a predetermined time, the notification section changes a notification method of the management target component, compared to a case where the remaining time is equal to or more than the predetermined time.

9. The component notification device according to claim 1, wherein when a humidity management level defined for the management target component is equal to or more than a predetermined level, the notification section changes a notification method of the management target component, compared to the management target component having the humidity management level less than the predetermined level.

10. The component notification device according to claim 1, wherein when multiple desiccators capable of storing the component container accommodating the management target component under a condition defined by a humidity management level of the management target component are provided, the notification section notifies of the desiccators that store the component container accommodating the management target component.

11. A feeder rack wherein the component container is a feeder in which a reel around which a component tape for accommodating the component is wound is rotatably supported, the feeder rack comprising:

the component notification device according to claim 1, wherein the feeder rack is the component holding unit that temporarily stores the feeder which is unloaded from a storage cabinet and is not yet used for production of a board product or the feeder which is no longer needed after the production of the board product ends.

12. A component notification device comprising:

a determination section configured to, when a component container accommodating a component to be mounted on a board is exposed to an atmosphere, determine whether the component accommodated in the component container is a management target component requiring humidity management; and a notification section configured to notify of presence of the management target component through at least one of visual, auditory, and tactile senses of a worker when the determination section determines that the component is the management target component, wherein the component container is stored in a component holding unit configured to temporarily store the component container which is unloaded from a storage cabinet and is not yet used for production of a board product or the component container which is no longer needed after the production of the board product ends, and when the determination section determines that the component is the management target component, the notification section causes the component container accommodating the management target component to protrude from a holding position to notify the worker of the presence of the management target component.

13. A component notification method comprising:

a determination step of, when a component container accommodating a component to be mounted on a board is stored in a component holding unit configured to temporarily store the component container exposed to an atmosphere, determining whether the component accommodated in the component container is a management target component requiring humidity management; and a notification step of notifying of presence of the management target component through at least one of visual, auditory, and tactile senses of a worker when it is determined that the component is the management target component in the determination step, wherein when determined in the determination step that the component is the management target component, an indicator provided at a portion of the component holding unit, at which a storage position where the component container is stored can be identified, is caused to light or blink, and the indicator corresponding to the storage position at which the component container accommodating the management target component is stored emits light.

* * * * *